(12) United States Patent
Kim et al.

(10) Patent No.: US 11,355,768 B2
(45) Date of Patent: Jun. 7, 2022

(54) ELECTROLYTE MEMBRANE FOR FUEL CELLS CAPABLE OF PREVENTING POISONING OF CATALYST AND METHOD OF PRODUCING THE SAME

(71) Applicants: Hyundai Motor Company, Seoul (KR); Kia Motors Corporation, Seoul (KR)

(72) Inventors: Byoungsu Kim, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/095,317

(22) Filed: Nov. 11, 2020

(65) Prior Publication Data

US 2021/0202971 A1    Jul. 1, 2021

(30) Foreign Application Priority Data

Dec. 31, 2019   (KR) .......................... 10-2019-0178871

(51) Int. Cl.
*H01M 8/1004* (2016.01)
*H01M 8/1007* (2016.01)
(Continued)

(52) U.S. Cl.
CPC ......... *H01M 8/1004* (2013.01); *H01M 4/881* (2013.01); *H01M 4/926* (2013.01);
(Continued)

(58) Field of Classification Search
CPC ..... H01M 2008/1095; H01M 2250/20; H01M 2300/0082; H01M 4/881; H01M 4/926;
(Continued)

(56) References Cited

U.S. PATENT DOCUMENTS

| 8,728,671 B1 | 5/2014 | Brost et al. |
| 9,847,533 B2 | 12/2017 | Berta et al. |

(Continued)

FOREIGN PATENT DOCUMENTS

| KR | 100683790 B1 | 2/2007 |
| KR | 2008-0047574 A | 5/2008 |

(Continued)

OTHER PUBLICATIONS

D. E. Curtin et al., J. Power Sources, 131, 41-48 (2004).
(Continued)

*Primary Examiner* — Victoria H Lynch
(74) *Attorney, Agent, or Firm* — Fox Rothschild LLP; Peter F. Corless (57) ABSTRACT

Disclosed are an electrolyte membrane for fuel cells that can prevent poisoning of catalysts and a method of producing the same. The electrolyte membrane for fuel cells includes an ion transport layer including an ionomer having proton conductivity, and a catalytic composite dispersed in the ion transport layer, wherein the catalytic composite includes a catalytic particle including a catalytic metal component having an activity of decomposing hydrogen peroxide, and a protective layer formed on at least a part of a surface of the catalytic particle to prevent the ionomer from contacting the catalytic metal component.

18 Claims, 4 Drawing Sheets

(51) Int. Cl.
  *H01M 4/92* (2006.01)
  *H01M 8/1069* (2016.01)
  *H01M 4/88* (2006.01)
  *H01M 8/10* (2016.01)

(52) U.S. Cl.
  CPC ......... *H01M 4/928* (2013.01); *H01M 8/1007* (2016.02); *H01M 8/1069* (2013.01); *H01M 2008/1095* (2013.01); *H01M 2250/20* (2013.01); *H01M 2300/0082* (2013.01)

(58) Field of Classification Search
  CPC .. H01M 4/928; H01M 8/1004; H01M 8/1007; H01M 8/1069
  See application file for complete search history.

(56) References Cited

U.S. PATENT DOCUMENTS

| | | | |
|---|---|---|---|
| 10,189,927 B2 | 1/2019 | Ino et al. | |
| 2010/0075203 A1* | 3/2010 | Braeuninger | H01M 8/1011 429/483 |

FOREIGN PATENT DOCUMENTS

| | | |
|---|---|---|
| KR | 100994124 B1 | 11/2010 |
| KR | 101206913 B1 | 11/2012 |
| KR | 2014-0129721 A | 11/2014 |

OTHER PUBLICATIONS

A. P. Young et al., J. Electrochem. Soc., 157, B425-B436 (2010).
P. Trogadas et al., Electrochem. Solid-State Lett., 11, B113-B116 (2008).
R. Uegaki et al., J. Power Sources, 196, 9856-9861 (2011).
D. Zhao et al., J. Power Sources, 190, 301-306 (2009).
R. W. Cahn et al., Mater. Sci. & Technol., Ch. 10, Wiley-VCH Verlag, GmBH (2000).
E. Endoh, ECS Trans., 16, 1229-1240 (2008).
D. Banham et al., J. Electrochem. Soc., 161, F1075-F1080 (2014).
Y. Zhu et al., J. Membr. Sci., 432, 66-72 (2013).
M. A. Hasan et al., Appl. Catal. A: General, 181, 171-179 (1999).
D. Zhao et al., J. Membr. Sci., 346, 143-151 (2010).
L. Gubler and W. H. Koppenol, J. Electrochem. Soc., 159, B211-B218 (2012).
Transition Metal Catalyst)[P. Trogadas et al., J. Mater. Chem., 21, 19381-19388 (2011).
M. Aoki et al et al., Electrochem. Commun. 8, 1509-1513 (2006).
N. Macauley et al., Electrochem. Lett., 2(4), F33-F35 (2013).
Baschuk et al., Int. J. Energy Res., 25, 695-713 (2001).
Cheng et al., J. Power Sources, 165, 739-756 (2007).
Ohma et al., Electrochim. Acta, 55, 8829-8838 (2010).
Kodama et al., J. Electrochem. Soc., 161, F649-F652 (2014).
Shinozaki et al., J. Power Sources, 325, 745-751 (2015).
Chlistunoff et al., J. Electroanal. Chem., 780, 134-146 (2016).
Budd P.M. (2013) High Free Volume Polymer. In: Drioli E., Giorno L. (eds) Encyclopedia of Membranes. Springer, Berlin, Heidelberg.
Budd et al., Polym. Chem., 1 (2010) 63-68.
Swaidan et al., Macromolecules 48 (2015) 6553-6561.

* cited by examiner

ELECTROLYTE MEMBRANE FOR FUEL CELLS CAPABLE OF PREVENTING POISONING OF CATALYST AND METHOD OF PRODUCING THE SAME

CROSS-REFERENCE TO RELATED APPLICATION

This application claims, under 35 U.S.C. § 119(a), the benefit of priority to Korean Patent Application No. 10-2019-0178871 filed on Dec. 31, 2019, the entire contents of which are incorporated herein by reference.

TECHNICAL FIELD

The present invention relates to an electrolyte membrane for fuel cells capable of preventing poisoning of catalysts and a method of producing the same.

BACKGROUND

Generally used fuel cells for vehicles are polymer electrolyte membrane fuel cells (PEMFCs). In order for polymer electrolyte membrane fuel cells to normally exert a high power of at least several tens of kW or greater, they should stably operate within a wide current density range.

The reaction for electricity production by fuel cells occurs in a membrane-electrode assembly (MEA), which includes a perfluorinated sulfonic acid ((PFSA) ionomer-based membrane and a pair of electrodes, that is, an anode and a cathode. Hydrogen supplied to an anode, which is an oxidation electrode, is split into a proton and an electron, and then the proton is moved through the membrane to a reduction electrode, that is, a cathode, and the electron is moved via an exterior circuit to the cathode. Then, at the cathode, an oxygen molecule, the proton and the electron react with one another, to produce electricity, and at the same time, water ($H_2O$) and heat, as byproducts.

Hydrogen and oxygen, which are reaction gases for fuel cells, may cross over through the electrolyte membrane. In this process, hydrogen peroxide (HOOH) may be produced. When hydrogen peroxide is split into an oxygen-containing radical such as a hydroxyl radical (.OH) and a hydroperoxyl radical (.OOH), the radicals attack the electrolyte membrane, causing chemical degradation of the electrolyte membrane and ultimately having the undesirable effect of reducing the durability of fuel cells.

In the related art, as a method of mitigating such chemical degradation of the electrolyte membrane, the addition of various kinds of antioxidants to the electrolyte membrane has been suggested. The antioxidants include primary antioxidants functioning as radical scavengers or quenchers, secondary antioxidants functioning as hydrogen peroxide decomposers and the like.

Examples of representative primary antioxidants used for polymer electrolyte membrane fuel cells include cerium-based antioxidants such as cerium oxide (ceria) and cerium (III) nitrate hexahydrate antioxidants, terephthalate-based antioxidants and the like. The cerium oxide may broadly include pure cerium oxide ($CeO_2$) and modified cerium oxide (modified $CeO_2$). The modified cerium oxide includes cerium-zirconium oxide ($CeZrO_x$), cerium-manganese oxide ($CeMnO_x$), cerium oxide-doped silica, cerium oxide-doped yttrium oxide, cerium oxide-doped zirconium oxide and the like.

Meanwhile, representative secondary antioxidants used for electrolyte membranes include manganese-based catalysts such as manganese oxide and noble metal catalysts such as platinum (Pt). Recently, various studies have been conducted on the addition of platinum catalysts to an electrolyte membrane for fuel cells.

Platinum is very stable and has high activity to oxygen reduction reaction (ORR). Nevertheless, the catalytic activity of platinum may be lost by poisoning.

For example, carbon monoxide (CO) generated by carbon corrosion may be adsorbed onto the surface of the catalyst, causing the catalyst to lose the catalytic activity thereof. In addition, sulfonate anions of perfluorinated sulfonic acid ionomers, which are used as proton conductors and binders in the electrode, are adsorbed on the surface of platinum, thus reducing the activity of platinum. At this time, the content of the perfluorinated sulfonic acid ionomer binder used in the electrode is generally 10% by weight to 60% by weight based on the total weight of the electrode. As described above, the problem of poisoning of the platinum catalyst by the perfluorinated sulfonic acid ionomer binder partially present in the electrode may be further exacerbated in the case of an electrolyte membrane composed mostly of a perfluorinated sulfonic acid ionomer. In other words, the perfluorinated sulfonic acid ionomer constituting the electrolyte membrane can poison platinum added as an antioxidant to increase the chemical durability of the electrolyte membrane.

Therefore, in order to increase the chemical durability of the electrolyte membrane, it is important to protect the platinum from poisoning by the ionomer and to maintain the inherent activity as an antioxidant of the original platinum.

The above information disclosed in this Background section is provided only for enhancement of understanding of the background of the invention, and therefore it may include information that does not form the prior art that is already known in this country to a person of ordinary skill in the art.

SUMMARY

In one preferred aspect, provided is an electrolyte membrane for a fuel cell capable of effectively removing hydrogen gas and oxygen gas that cross over the electrolyte membrane and a method of producing the same.

In one preferred aspect, provided is an electrolyte membrane for fuel cells capable of preventing a catalytic metal component contained in the electrolyte membrane from being poisoned by an ionomer contained in the electrolyte membrane, and a method of producing the same.

In one aspect, provided is an electrolyte membrane for fuel cells including an ion transport layer including an ionomer having proton conductivity, and a catalytic composite dispersed in the ion transport layer. The catalytic composite may include a catalytic particle including a catalytic metal component having an activity of decomposing hydrogen peroxide, and a protective layer formed on at least a part of a surface of the catalytic particle to prevent the ionomer from contacting the catalytic metal component.

The ionomer may have a proton-conducting functional group.

The catalytic particle may include the catalytic metal component without a support.

Alternatively, the catalytic particle may include the catalytic metal component supported on a support.

The catalytic metal component may suitably include one or more selected from the group consisting of platinum (Pt), gold (Au), palladium (Pd), silver (Ag), osmium (Os), iridium (Ir), and ruthenium (Ru).

The support may include one or more selected from the group consisting of: carbon; silica; zeolites; transition metals selected from the group consisting of Groups 4B, 5B, 6B, 7B and 8B; and oxides or carbides of the transition metals.

The protective layer may include a polymer having no proton-conducting functional group in a side chain and having no ionic group in a main chain.

The protective layer may be incompatible with the ionomer.

The protective layer may include a polymer having a gas permeability of about 10 barrer or greater.

The protective layer may include a polymer having a free volume of about 0.20 or greater and including one or more selected from the group consisting of a polyacetylene polymer, a norbornene polymer, a fluorohydrocarbon polymer, a polymer of intrinsic microporosity (PIM), and substituents or derivatives thereof.

The polyacetylene polymer may suitably include one or more selected from the group consisting of poly(1-(trimethylsilyl)-1-propyne (PTMSP), poly(4-methyl-2-pentyne) (PMP), poly(tert-butylacetylene) (PTBA), poly(1-phenyl-1-propyne) (PPP) and combinations thereof.

The norbornene polymer may suitably include poly(trimethylsilyl norbornene) (PTMSN).

The fluorohydrocarbon polymer may suitably include poly[4,5-difluoro-2,2-bis(trifluoromethyl)-1,3-dioxole-co-tetrafluoroethylene]. The electrolyte membrane may suitably include the catalytic composite in an amount of 0.01 mg/cm$^2$ to 0.90 mg/cm$^2$.

The electrolyte membrane may further include a reinforcing layer such that the ion transport layer may be formed on at least one surface of the reinforcing layer.

In another aspect, provided is a method of producing the electrolyte membrane for fuel cells. The method may include preparing a catalytic composite including a catalytic particle including a catalytic metal component having an activity of decomposing hydrogen peroxide and a protective layer formed on at least a part of a surface of the catalytic particle, preparing a dispersion admixture including the catalytic composite and an ionomer, and forming an ion transport layer by applying the dispersion admixture.

The catalytic composite may be prepared by drying a mixture including the catalytic particle with a polymer constituting the protective layer at a temperature of about 80° C. to 200° C.

The ion transport layer may be formed by applying the dispersion admixture on at least one surface of the reinforcing layer.

Further provided is a fuel cell including the electrolyte membrane as described herein.

Also provided is a vehicle including the fuel cell described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

The objects described above, and other objects, features and advantages will be clearly understood from the following preferred embodiments with reference to the annexed drawings. However, the present invention is not limited to the embodiments, and will be embodied in different forms. The embodiments are suggested only to offer thorough and complete understanding of the disclosed contents and to sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, these elements should not be construed as being limited by these terms, and are used only to distinguish one element from another. For example, within the scope defined by the present invention, a first element may be referred to as a second element, and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that, when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the ranges unless otherwise defined. Furthermore, when the range refers to integers, it includes all integers from the minimum to the maximum including the maximum within the range, unless otherwise defined.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
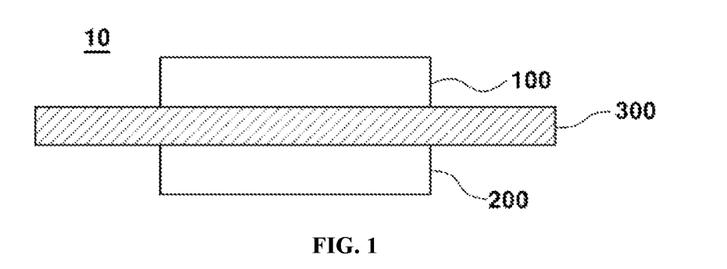
FIG. 1 is a sectional view schematically showing an exemplary membrane-electrode assembly according to an exemplary embodiment of the present invention.

FIG. 1 is a sectional view schematically showing an exemplary membrane-electrode assembly (MEA, 10) according to an exemplary embodiment of the present invention. As shown in FIG. 1, the membrane-electrode assembly 10 includes a cathode 100, an anode 200 and an electrolyte membrane 300 interposed therebetween.

The cathode 100 is a component that reacts with oxygen gas in the air and the anode 200 is a component that reacts with hydrogen gas. Specifically, the anode 200 decomposes hydrogen into a hydrogen ion (proton) and an electron through a hydrogen-oxidation reaction (HOR). The hydrogen ion moves to the cathode 100 through the electrolyte membrane 300 contacting the anode 200. The electron moves to the cathode 100 through an external wire (not shown).

The cathode 100 and the anode 200 may include a catalyst such as carbon-supported Pt. The cathode 100 and the anode 200 may also include an ionomer (or binder) for conduction of protons therein.

Figure 2:
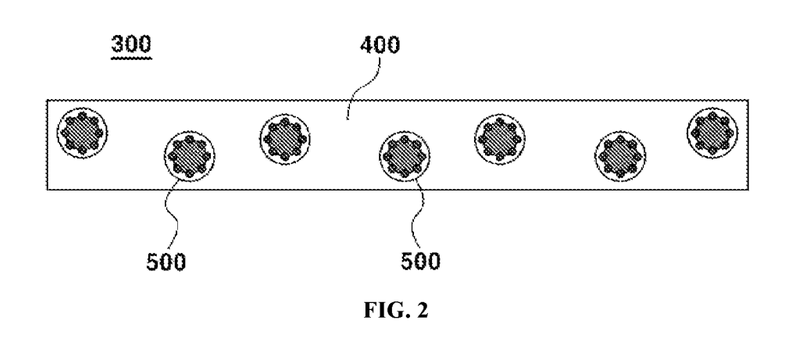
FIG. 2 shows an exemplary electrolyte membrane according to an exemplary embodiment of the present invention.

FIG. 2 shows an electrolyte membrane 300 according to one embodiment of the present invention. Referring to FIG. 2, the electrolyte membrane 300 includes an ion transport layer 400 and a plurality of catalytic composites 500 dispersed in the ion transport layer 400.

The ion transport layer 400 may include an ionomer having hydrogen ion (proton) conductivity. That is, the ionomer may be a polymer having a proton-conducting functional group. The proton-conducting functional group may include sulfonic acid, sulfonate, carboxylic acid, carboxylate, phosphoric acid, phosphate and the like. For example, the ionomer may include perfluorinated sulfonic acid ionomer (PFSA) including a proton-conducting functional group. When the proton-conducting functional group included in the ionomer reacts with a catalytic metal component such as platinum (Pt), the catalytic metal component may be poisoned and thus lose its activity. The details thereof will be described later.

Figure 3A:
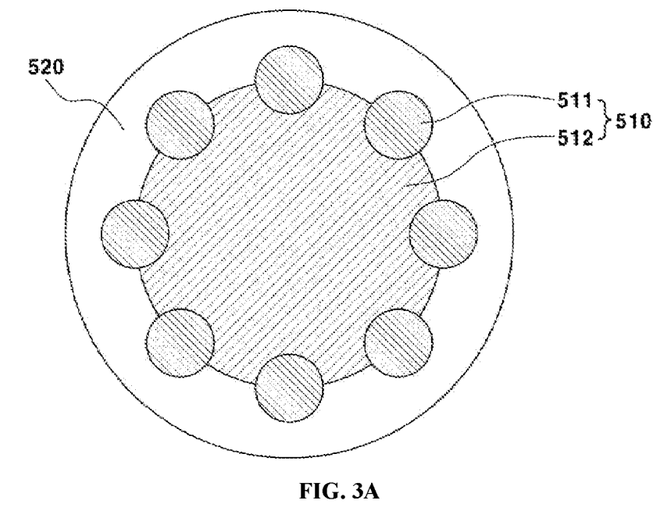
FIG. 3A shows an example of an exemplary catalytic composite according to an exemplary embodiment of the present invention.

FIG. 3A illustrates an example of each catalytic composite 500. As shown in 3A, the catalytic composite 500 includes a catalytic particle 510 and a protective layer 520 formed on at least a part of the surface of the catalytic particle 510. FIG. 3A shows that the protective layer 520 completely coats the catalytic particle 510. However, this is provided for better understanding of the present invention, and thus the catalytic composite 500 according to the present invention should not be construed as being limited to the shape shown in FIG. 3A. For example, the protective layer 520 surrounds at least about 1%, at least about 5%, at least about 10%, at least about 20%, at least about 30%, at least about 40%, at least about 50%, at least about 60%, at least about 70%, at least about 80%, at least about 90%, or 100% of the surface area of the catalytic particle 510.

Figure 3B:
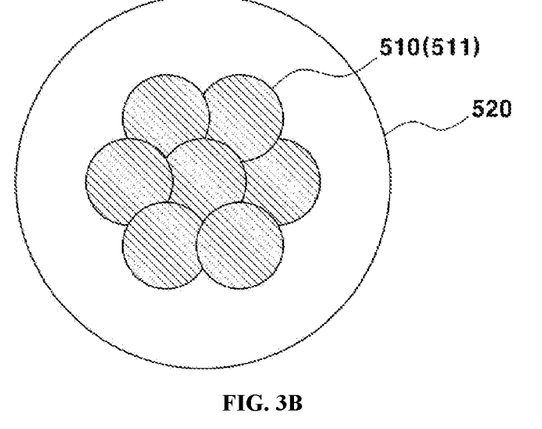
FIG. 3B shows another example of the catalytic composite according to an exemplary embodiment of the invention.

FIG. 3B shows another example of the catalytic composite 500. As shown in FIG. 3B, the catalytic particle 510 may include only a catalytic metal component 511 without a support, and a coating layer 520 may be formed on at least a part of the surface of each catalytic particle 510. Hereinafter, for convenience of description, the catalytic particle 510 is assumed to have a structure in which the catalytic metal component 511 is supported on the support 512. However, it should also be interpreted that the scope of the present invention includes catalytic particles 510 not having such a support 512.

The catalytic metal component 511 may include a metal having the activity of decomposing hydrogen peroxide, which is for example selected from the group consisting of platinum (Pt), gold (Au), palladium (Pd), silver (Ag), osmium (Os), iridium (Ir), ruthenium (Ru) and combinations thereof.

The support 512 is not particularly limited, and may include one or more selected from the group consisting of: carbon; silica; zeolites; transition metals selected from the group consisting of Groups 4B, 5B, 6B, 7B and 8B; and oxides or carbides of the transition metals.

The support 512 preferably may have a large specific surface area. As described above, a catalyst may also be added to the cathode 100 and/or the anode 200. The support 521 may have a much larger specific surface area than the support of the catalyst used for the electrode as described above. Particularly, the support used for the electrode should have a high graphitization degree so as to withstand carbon corrosion, which occurs rapidly when the electrode is exposed to a high voltage of greater than 1V. However, since there is a tradeoff between the graphitization degree and the specific surface area, it is not practically easy to obtain a support having both a high graphitization degree and a large specific surface area. Thus, a support having a high specific surface area maybe used regardless of the graphitization degree because only an electric voltage difference of about 0 to 1V needs to be withstood in the electrolyte membrane. The support 512 may have a specific surface area of about 100 $m^2/g$ to 3,000 $m^2/g$, of about 500 $m^2/g$ to 3,000 $m^2/g$, or particularly of about 800 $m^2/g$ to 3,000 $m^2/g$. Therefore, the support 512 may support a high amount of the catalytic metal component.

In addition, the support 512 may have an average particle diameter of about 10 nm to 200 nm, specifically or particularly of about 50 nm to 200 nm.

The catalytic composite 500 may include a protective layer 520 that may prevent poisoning of the catalytic particle 510 and contains a polymer that effectively permeates gas such as hydrogen and oxygen gas that crosses the electrolyte membrane 300 on at least a part of the surface of the catalytic particle 510, or particularly a part of the surface of the catalytic metal component 511.

Figure 4:
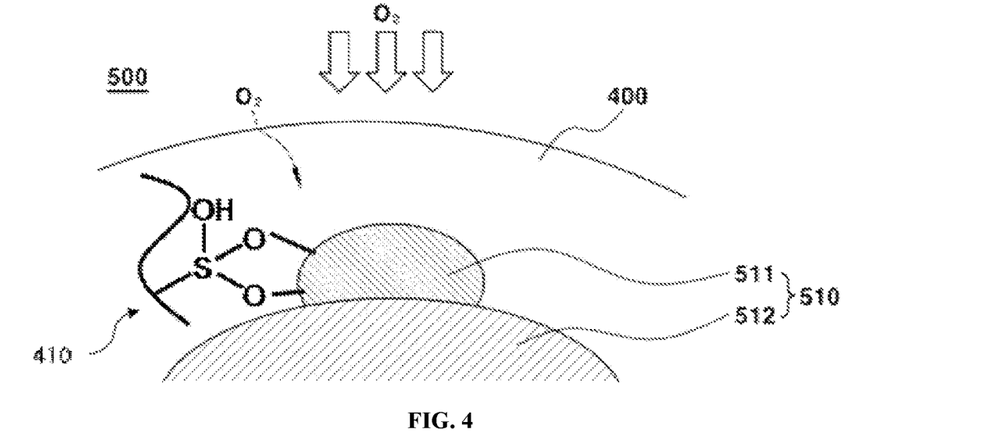
FIG. 4 shows poisoning of a catalytic metal component contained in the electrolyte membrane when there is no protective layer.

FIG. 4 shows that the catalytic metal component 511 is poisoned by the ionomer 410 of the ion transport layer 400 when the protective layer 520 is not present. As shown in FIG. 4, the catalytic metal component 511 may be poisoned by an oxygen element of sulfonate (—SO₃H), which is a proton-conducting functional group of the ionomer 410.

Figure 5:
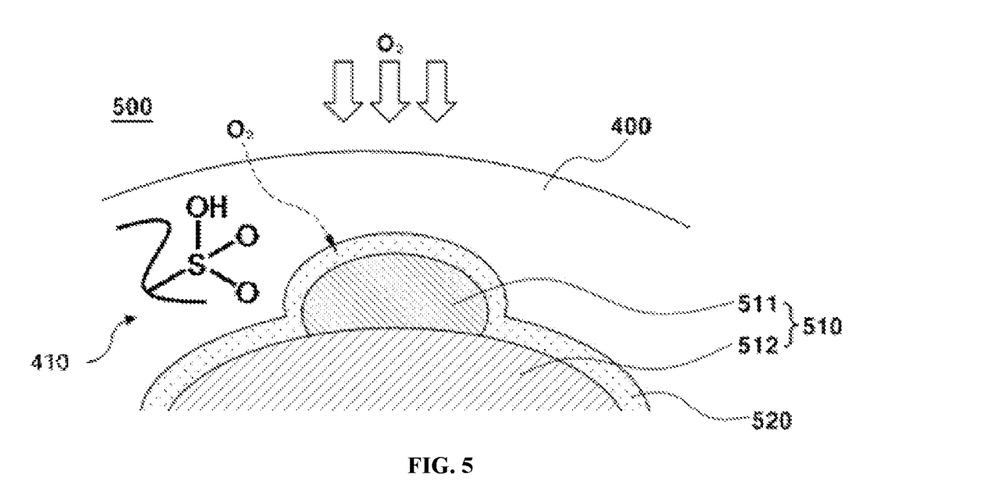
FIG. 5 shows that poisoning of an exemplary catalytic metal component contained in an exemplary electrolyte membrane is prevented when an exemplary protective layer is formed according to an exemplary embodiment of the present invention.

FIG. 5 shows that poisoning of the catalytic metal component 511 is prevented when the protective layer 520 is formed as in the present invention. As shown in FIG. 5, the protective layer 520 physically prevents the proton-conducting functional group included in the ionomer 410 from contacting the catalytic metal component 511, thus preventing the catalytic metal component 511 from being poisoned by the ionomer 410.

In addition, as described above, the protective layer 520 may be formed of a polymer having high gas permeability and thus exhibits greater gas permeability than that of the ion transfer layer 400 adjacent thereto. Therefore, the flow of hydrogen and oxygen gas that cross over through the electrolyte membrane 300 may be induced to reach the catalytic metal component 511 more easily.

As a result, the catalytic metal component 511 may be prevented from being poisoned by the ionomer 410 and to enable hydrogen and oxygen gas to reach the catalytic metal component 511 and thereby decompose the hydrogen and oxygen gas. Thus, chemical durability of the electrolyte membrane 300 can be greatly improved.

The protective layer 520 may include a polymer that is chemically very stable or that is not reactive with the catalytic metal component 511. Particularly, the protective layer 520 may include a non-ionic polymer. For example, the protective layer 520 may suitably include a polymer having no proton-conducting functional group in the side chain and no ionic group in the main chain. As such, the catalytic metal component 511 may be prevented from being poisoned by the protective layer 520.

The protective layer 520 may include a polymer that is incompatible with the ionomer. Here, the term "incompatible" means that, when two substances are mixed, they are not homogeneously mixed at the molecular level, and are thus phase-separated or form an interface due to the difference in the chemical properties therebetween.

The protective layer 520 may include a polymer having a gas permeability of 10 barrer or greater, or 100 barrer or greater. The upper limit of the gas permeability is not particularly limited, and may be a theoretical value that can be achieved physicochemically. For example, the gas permeability of the polymer may about be 1,000 barrer or less. When the gas permeability of the polymer included in the protective layer 520 is less than about 10 barrer, the gas permeability may be too low for the hydrogen and oxygen gas to permeate and to reach the catalytic metal component 511.

The term "barrer" is a non-SI unit of water-soluble gas permeability, wherein 1 barrer is $10^{-11}$ cm³ (STP)·cm·cm⁻²·s⁻¹·mmHg⁻¹. The term "cm³ (STP)" refers to a molar amount of gas rather than an actual volume (i.e., the amount of gas absorbed at 1 square centimeter at standard temperature and pressure, as calculated in accordance with the ideal gas law). The term "cm" refers to the thickness of the material, the permeability of which is evaluated, and the term "cm⁻²" is an inverse number of the surface area of the material.

The protective layer 520 may contain a polymer having a free volume of 0.20 or greater, which may include one or more selected from the group consisting of a polyacetylene polymer, a norbornene polymer, a fluorohydrocarbon polymer, a polymer of intrinsic microporosity (PIM), and substituents or derivatives thereof.

The polyacetylene polymer may suitably include one or more selected from the group consisting of poly(1-(trimethylsilyl)-1-propyne (PTMSP), poly(4-methyl-2-pentyne) (PMP), poly(tert-butylacetylene) (PTBA), and poly(1-phenyl-1-propyne) (PPP). For example, the polyacetylene polymer may include poly(1-(trimethylsilyl)-1-propyne (PTMSP) represented by the following Formula 1 and having a free volume of about 0.33.

[Formula 1]

The norbornene polymer may suitably include poly(trimethylsilyl norbornene) (PTMSN) represented by the following Formula 2 and having a free volume of about 0.28.

[Formula 2]

The fluorohydrocarbon polymer may suitably include poly[4,5-difluoro-2,2-bis(trifluoromethyl)-1,3-dioxole-co-tetrafluoroethylene] represented by the following Formula 3 and having a free volume of about 0.33.

[Formula 3]

The polymer of intrinsic microporosity (PIM) is generally a polymer containing tetrahedral carbons as points of contortion. The polymer of intrinsic microporosity (PIM) may include organic planar macromolecules interconnected through a rigid linker. The linker has at least one contortion point which connects two planar macromolecules, and the two planar macromolecules are rigidly interconnected in a non-coplanar direction. The contortion point may, for example, be a spiro group, a bridged ring moiety or a covalent bond with limited rotation adjacent thereto. The polymer of intrinsic microporosity (PIM) may, for example, include PIM-1 represented by the following Formula 4 and having a free volume of about 0.24 to 0.26.

[Formula 4]

The electrolyte membrane 300 may include the catalytic composite 500 in an amount of about 0.01 mg/cm$^2$ to 0.90 mg/cm$^2$, or about 0.05 mg/cm$^2$ to 0.40 mg/cm$^2$. When the content of the catalytic composite 500 is excessively low, the effect of increasing the chemical durability of the electrolyte membrane may be insignificant. When the content is excessively high, costs may greatly increase, and it may be difficult to secure electrical insulation in the electrolyte membrane.

Figure 6:
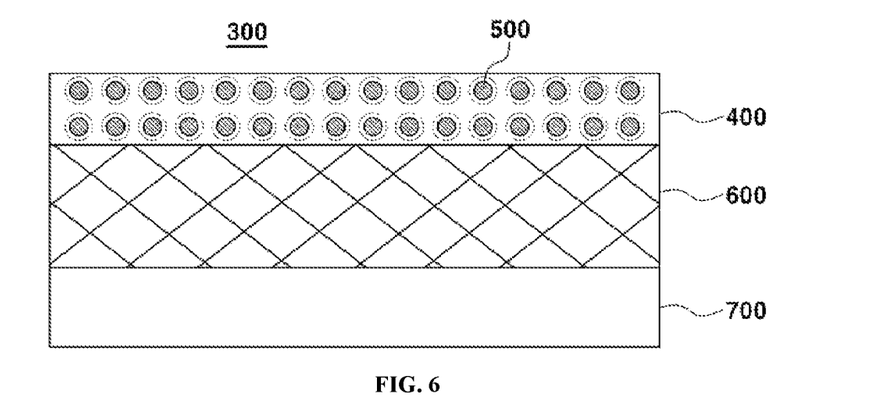
FIG. 6, FIG. 7 and FIG. 8 show exemplary modified electrolyte membranes according an exemplary embodiments of the present invention.
Figure 7:
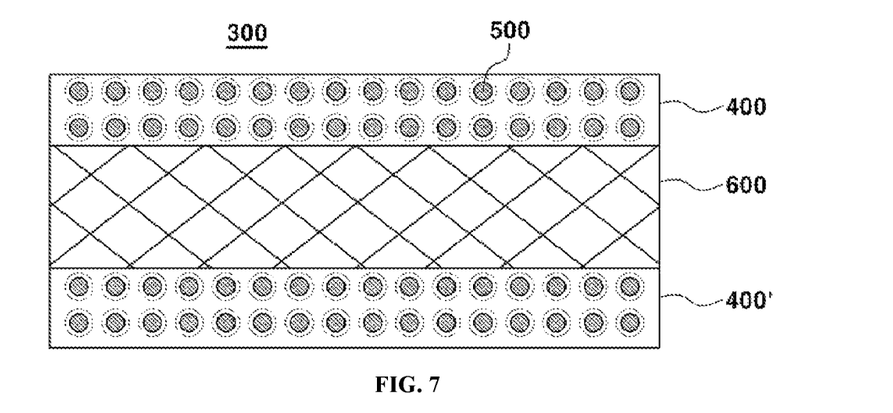
Figure 8:
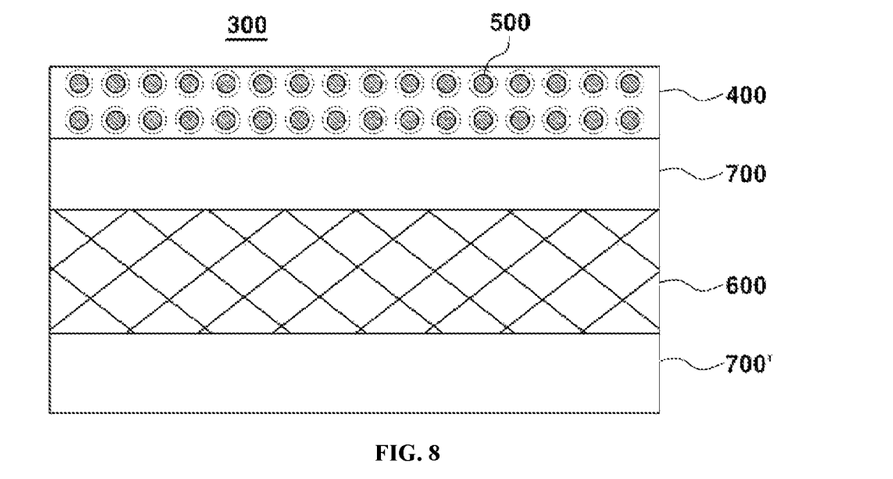

FIGS. 6 to 8 each show a modified structure of the electrolyte membrane 300 according to exemplary embodiments of the present invention.

The electrolyte membrane 300 may include a reinforcing layer 600 and an ion transport layer 400 formed on at least one surface of the reinforcing layer 600.

The reinforcing layer 600 may include a component for improving the mechanical strength (rigidity) of the electrolyte membrane 300. The reinforcing layer 300 may suitably include one or more selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), and polyvinyl chloride (PVC), and may be a porous membrane having a large number of pores.

The reinforcing layer 600 may be porous and may be impregnated with the ionomer as described above.

As shown in FIG. 6, the electrolyte membrane 300 may include the ion transport layer 400 including the catalytic composite 500 on one surface of the reinforcing layer 600 impregnated with an ionomer, and may include an ionomer layer 700 including only an ionomer on the other surface thereof.

As shown in FIG. 7, the electrolyte membrane 300 may include ion transfer layers 400 and 400' including the catalytic composite 500 on two surfaces of the reinforcing layer 600 impregnated with an ionomer.

As shown in FIG. 8, the electrolyte membrane 300 may include an ion transfer layer 400 including an ionomer layer 700 and the catalytic composite 500 on one surface of the reinforcing layer 600 impregnated with an ionomer and another ionomer layer 700' on another surface thereof.

FIGS. 6 to 8 merely exemplarily show various embodiments of the electrolyte membrane 300 according to the present invention, but do not limit the scope of the electrolyte membrane 300. That is, any configuration other than the configurations shown in FIGS. 6 to 8 falls within the scope of the electrolyte membrane 300 according to the present invention, as long as the ion transport layer 400 including the catalytic composite 500 is formed on at least one surface of the reinforcing layer 600.

A method of producing an electrolyte membrane 300 according to the present invention includes preparing a catalytic composite 500 including the catalytic particle 510 and a protective layer 520 formed on at least a part of the surface of the catalytic particle 510, mixing the catalytic composite 500 with an ionomer to prepare a dispersion admixture, and applying the dispersion admixture to form an ion transport layer 400.

Details of the respective components of the catalytic particle 510, the protective layer 520, the catalytic composite 500 and the like have been described above, and will be omitted below.

The catalytic composite 500 may be prepared by drying a mixture obtained by mixing the catalytic particle with the above-mentioned polymer constituting the protective layer at 80° C. to 200° C. In this case, the mixture may be prepared by adding the catalytic particle and the polymer in a solvent, followed by stirring. When the drying temperature for the mixture is less than about 80° C., the solvent does not evaporate sufficiently, and thus it is difficult to powderize the catalytic composite 500, and when the temperature is greater than about 200° C., the material may be pyrolyzed.

The method of applying the dispersion admixture is not specifically limited. For example, the dispersion admixture may be applied by screen printing, spray coating, coating using a doctor blade, gravure coating, dip coating, silk screening, painting, coating using a slot die or the like.

As described above, the electrolyte membrane 300 may include the reinforcing layer 600.

The electrolyte membrane 300 shown in FIG. 6 may be produced through a method including applying an ionomer solution onto a substrate, supplying a porous reinforcing layer 600 to the ionomer solution to impregnate the reinforcing layer 600 with the ionomer and thereby to form an ionomer layer 700, applying the dispersion admixture to one surface of the reinforcing layer 600 facing the ionomer layer 700 to form an ion transport layer 400, and performing drying and heat treatment. However, the production method is not limited thereto, and may be performed by appropriately modifying specific means such as the order of each step and application. In addition, the electrolyte membrane 300 may be produced by other methods such as impregnation and transfer as well as application. This also applies to the case of other production methods described later.

The drying after forming the ion transport layer 400 may be performed at a temperature of about 100° C. or less for about 30 minutes or more. When the drying temperature is greater than about 100° C., the ionomer may be pyrolyzed. On the other hand, when the drying time is less than 30 minutes, drying may not be appropriate.

The heat treatment may be carried out at a temperature of about 110° C. or greater for about 20 minutes or less. When the time for heat treatment is too long, the ionomer may be pyrolyzed.

The electrolyte membrane 300 shown in FIG. 7 may be produced through a method including supplying a porous reinforcing layer 600 to the dispersion admixture to impregnate the reinforcing layer 600 with an ionomer and thereby to form one ion transport layer 400', applying the dispersion admixture to one surface of the reinforcing layer 600 facing the ion transport layer 400' to form another ion transport layer 400, and performing drying and heat treatment.

The electrolyte membrane 300 shown in FIG. 8 may be produced through a method including supplying a porous reinforcing layer 600 to the ionomer solution to impregnate the reinforcing layer 600 with the ionomer and thereby form one ionomer layer 700', applying an ionomer to one surface of the reinforcing layer 600 facing the ionomer layer 700' to form another ionomer layer 700, applying the dispersion admixture onto the ionomer layer 700 to form an ion transport layer 400 and performing drying and heat treatment.

The electrolyte membrane 300 and the method of producing the same according to various exemplary embodiments of the present invention have been described above. The key feature of the present invention is that the catalytic particle 500 including the catalytic metal component 511 having the activity of decomposing hydrogen peroxide is injected into the electrolyte membrane 300 and that a protective layer 520 capable of preventing poisoning of the ionomer on the surface thereof and having high gas permeability is formed on the surface thereof, so that both oxidation resistance and chemical durability of the electrolyte membrane 300 can be improved. It will be apparent that other embodiments designed or modified from the various embodiments described above may be easily derived from the present invention and fall within the scope of the present invention, as long as the embodiments have the aforementioned objects and effects.

The electrolyte membrane may include a protective layer formed by coating catalytic particles with a polymer being chemically stable and having high gas permeability, thus preventing the catalytic particles from being poisoned by the ionomer, and, at the same time, effectively removing hydrogen and oxygen gas crossing over the electrolyte membrane, thereby greatly improving the oxidation resistance and chemical durability of the electrolyte membrane.

The effects of the present invention are not limited to those mentioned above. It should be understood that the effects of the present invention include all effects that can be inferred from the foregoing description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An electrolyte membrane for fuel cells comprising:
   an ion transport layer comprising an ionomer having proton conductivity; and
   a catalytic composite dispersed in the ion transport layer, wherein the catalytic composite comprises:
   a catalytic particle comprising a catalytic metal component having an activity of decomposing hydrogen peroxide; and
   a protective layer coated on a surface of the catalytic particle to prevent the ionomer from contacting the catalytic metal component
   wherein the protective layer comprises a polymer having a free volume of about 0.20 or greater.

2. The electrolyte membrane according to claim 1, wherein the ionomer has a proton-conducting functional group.

3. The electrolyte membrane according to claim 1, wherein the catalytic particle comprises the catalytic metal component without a support.

4. The electrolyte membrane according to claim 1, wherein the catalytic particle comprises the catalytic metal component supported on a support.

5. The electrolyte membrane according to claim 1, wherein the catalytic metal component comprises one or more selected from the group consisting of platinum (Pt), gold (Au), palladium (Pd), silver (Ag), osmium (Os), iridium (Ir), and ruthenium (Ru).

6. The electrolyte membrane according to claim 4, wherein the support comprises one or more selected from the group consisting of: carbon; silica; zeolites; transition metals selected from the group consisting of Groups 4B, 5B, 6B, 7B and 8B; oxides or carbides of the transition metals.

7. The electrolyte membrane according to claim 1, wherein the protective layer comprises a polymer having no proton-conducting functional group in a side chain and having no ionic group in a main chain.

8. The electrolyte membrane according to claim 1, wherein the protective layer is incompatible with the ionomer.

9. The electrolyte membrane according to claim 1, wherein the protective layer comprises a polymer having a gas permeability of about 10 barrer or greater.

10. The electrolyte membrane according to claim 1, wherein the protective layer comprises one or more from the group consisting of a polyacetylene polymer, a norbornene polymer, a fluorohydrocarbon polymer, a polymer of intrinsic microporosity (PIM), and substituents or derivatives thereof.

11. The electrolyte membrane according to claim 10, wherein the polyacetylene polymer comprises one or more selected from the group consisting of poly(1-(trimethylsilyl)-1-propyne (PTMSP), poly(4-methyl-2-pentyne) (PMP), poly(tert-butylacetylene) (PTBA), and poly(1-phenyl-1-propyne) (PPP),
   the norbornene polymer comprises poly(trimethylsilyl norbornene) (PTMSN) and
   the fluorohydrocarbon polymer comprises poly[4,5-difluoro-2,2-bis(trifluoromethyl)-1,3-dioxole-co-tetrafluoroethylene].

12. The electrolyte membrane according to claim 1, wherein the electrolyte membrane comprises the catalytic composite in an amount of about 0.001 $mg/cm^2$ to 0.90 $mg/cm^2$.

13. The electrolyte membrane according to claim 1, wherein the electrolyte membrane further comprises: a reinforcing layer,
   wherein the ion transport layer is formed on at least one surface of the reinforcing layer.

14. A method of producing the electrolyte membrane for fuel cells according to claim 1, comprising:
   preparing the catalytic composite comprising the catalytic particle comprising the catalytic metal component having an activity of decomposing hydrogen peroxide and the protective layer formed on at least a part of a surface of the catalytic particle;
   preparing a dispersion admixture comprising the catalytic composite and the ionomer; and
   forming the ion transport layer by applying the dispersion admixture.

15. The method according to claim 14, wherein the catalytic composite is prepared by drying a mixture obtained comprising the catalytic particle with a polymer constituting the protective layer at a temperature of about 80° C. to 200° C.

16. The method according to claim 14, wherein the ion transport layer is formed by applying the dispersion admixture on at least one surface of a reinforcing layer.

17. A fuel cell comprising the electrolyte membrane of claim 1.

18. A vehicle comprising the fuel cell of claim 17.

* * * * *